United States Patent [19]
Altman et al.

[11] 3,902,811
[45] Sept. 2, 1975

[54] ELECTRO-OPTICAL SCANNING SYSTEM FOR DIMENSIONAL GAUGING OF PARTS

[75] Inventors: Norman G. Altman, White Plains, N.Y.; Marc G. Dreyfus, Stamford, Conn.

[73] Assignee: Bai Corporation, Stamford, Conn.

[22] Filed: Sept. 9, 1974

[21] Appl. No.: 504,289

Related U.S. Application Data
[63] Continuation-in-part of Ser. No. 374,113, June 27, 1973, Pat. No. 3,854,822.

[52] U.S. Cl. ............... 356/156; 356/160; 356/168; 356/171; 178/DIG. 36; 250/559
[51] Int. Cl. .......................................... G01b 11/24
[58] Field of Search .......... 356/156, 160, 168, 171; 340/146.2; 178/DIG. 36, 7.6; 250/559, 560

[56] References Cited
UNITED STATES PATENTS

| | | | |
|---|---|---|---|
| 3,222,979 | 12/1965 | Webster | 178/DIG. 36 |
| 3,739,091 | 6/1973 | Kurasawa | 178/DIG. 36 |

*Primary Examiner*—Ronald J. Stern
*Assistant Examiner*—Paul K. Godwin

[57] ABSTRACT

An electro-optical system for gauging the dimensions of a machined part by measuring coordinates of critical portions thereof to determine whether the part meets predetermined standards. The system includes a scanner having a sensitive face onto which is projected an image of the outline of the part being measured. Scan voltages for the scanner are developed by a scan generator to create a scan path which traverses those edges of the image of the part outline whose coordinates are to be determined, thereby causing the scanner to yield a video signal from which coordinate information can be derived. The relationship between the scan command and the coordinates of the image plane being scanned is known and controlled whereby the coordinates of any edge in the image plane can be determined simply by comparing the time of occurrence of that video edge and the command to the scanner. This coordinate information is then used to determined dimensions on the image plane. Each such dimension is then compared with a stored number representing the nominal value of the dimension being measured to produce an output signal indicating the disparity between the dimension measured and the nominal value thereof.

14 Claims, 25 Drawing Figures

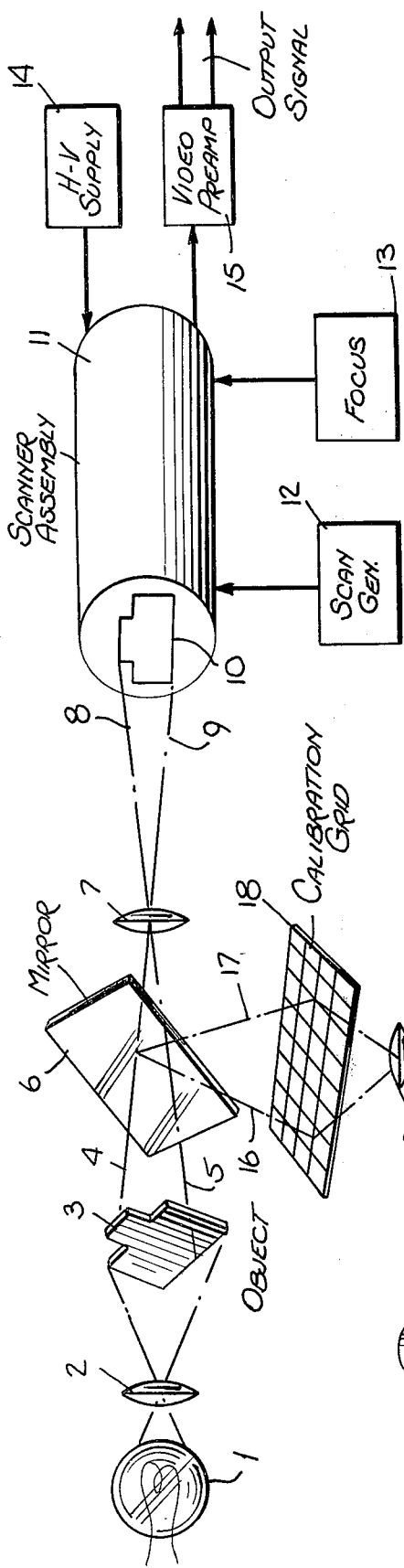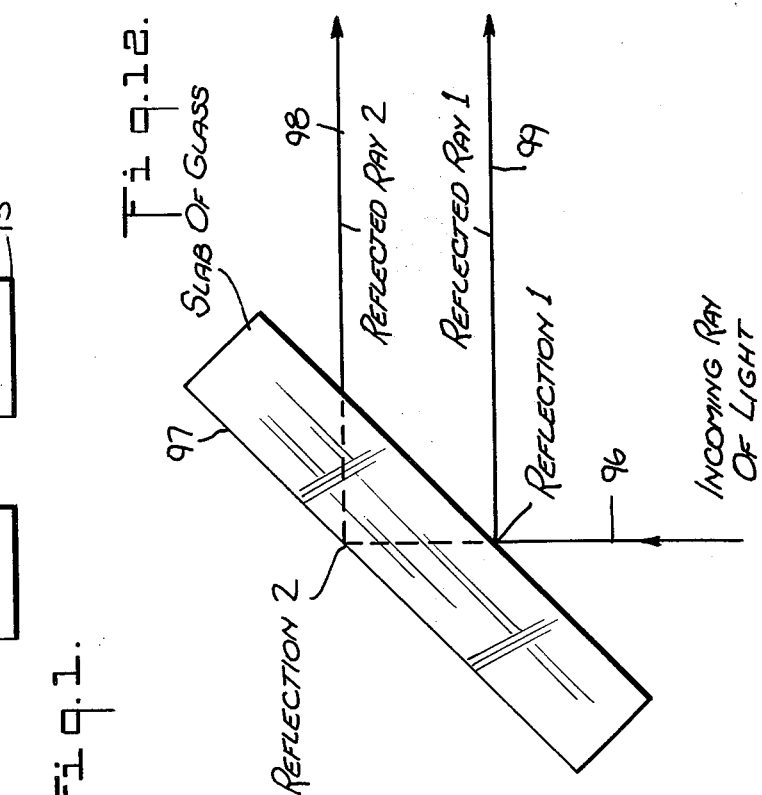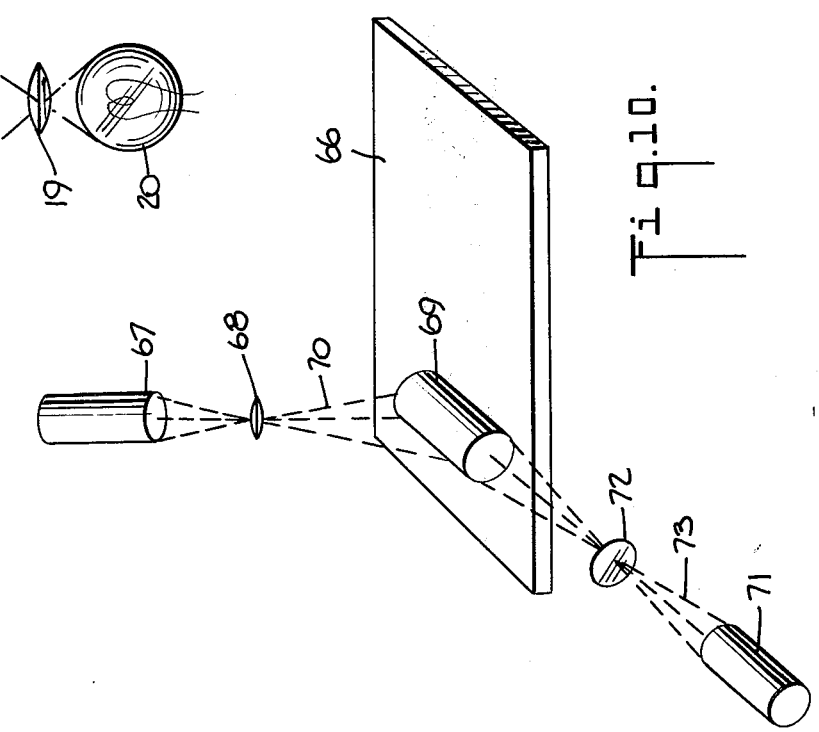

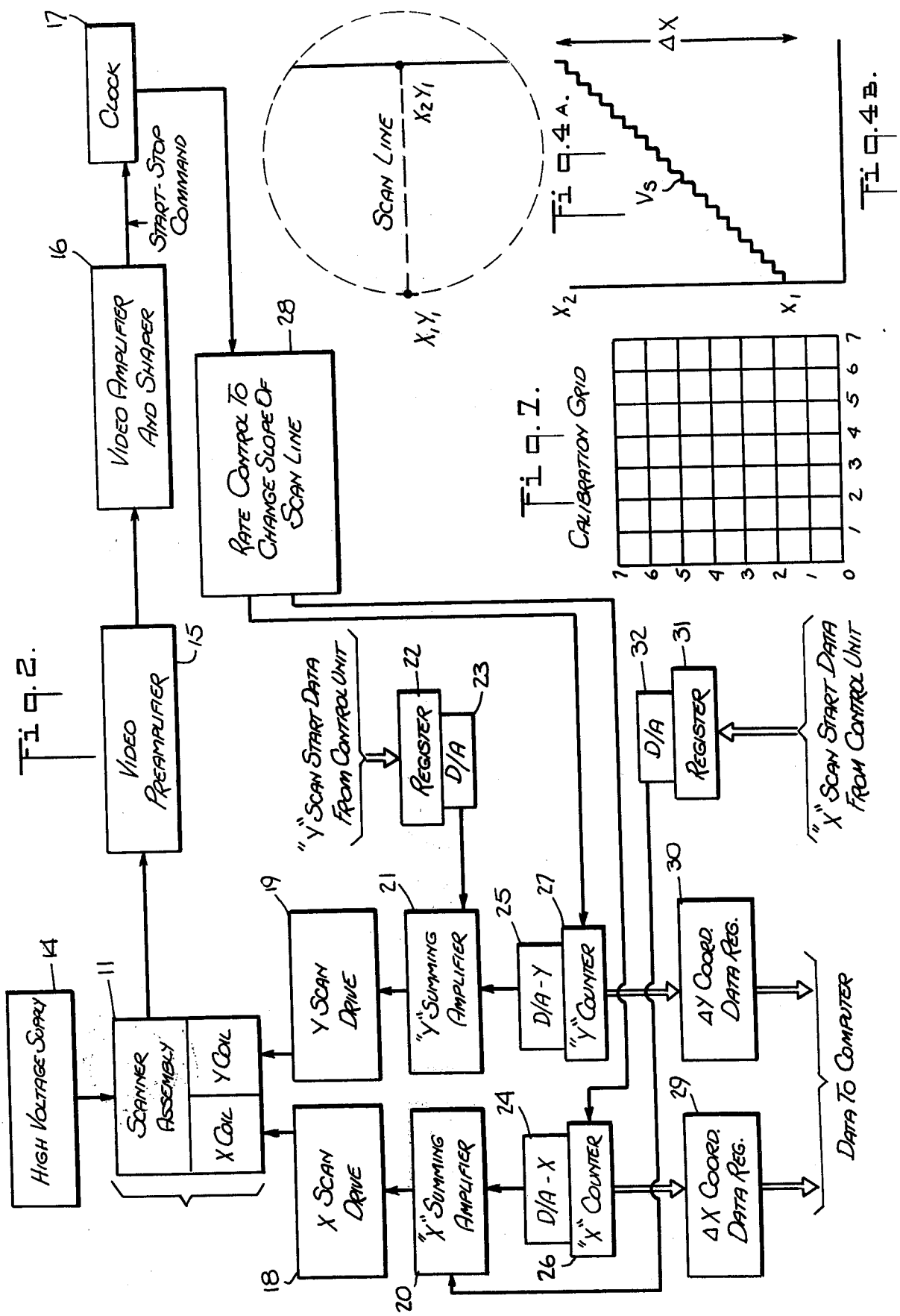

| Coordinate Position No. | Coordinates | Scan ∠ | X Total | Y Total | Comp. Sub R | Disposition Sub R |
|---|---|---|---|---|---|---|
| A | 0+, 0 | 90° | | | | |
| B | 0, 0+ | 0° | | | | |
| C | 0, 1- | 0° | | | | |
| D | 0+, 1 | 90° | | | | |
| E | 2-, 1 | 90° | | | | |
| F | 2, 1+ | 0 | | | | |
| G | 1, 2- | 0 | | | | |
| H | 1+, 2 | 90° | | | | |
| I | 3-, 2 | 90° | | | | |
| J | 3, 2- | 0 | | | | |
| K | 3, 1+ | 0 | | | | |
| L | 3+, 1 | 90° | | | | |
| M | 4-, 1 | 90° | | | | |
| N | 4, 1- | 0 | | | | |
| O | 4, 0+ | 0 | | | | |
| P | 4-, 0 | 90° | | | | |

3,902,811

ELECTRO-OPTICAL SCANNING SYSTEM FOR DIMENSIONAL GAUGING OF PARTS

Related Application

This application is a continuation-in-part of our copending application Ser. No. 374,113, filed June 27, 1973, now U.S. Pat. No. 3,854,822.

BACKGROUND OF THE INVENTION

This invention relates generally to an electro-optical system for gauging the dimensions of individual parts or assemblies thereof.

Modern manufacturing technology makes possible the production and assembly of parts at an extremely rapid rate, even to the extent of thousands of units per minute. There is however no commercially feasible technique capable of automatically and accurately gauging the dimensions of the manufactured parts at the same rapid rate to determine whether they meet all dimensional tolerance.

The common practice therefore is not to individually measure each part or assemblies thereof, but to inspect samples taken from the production line. But available inspection rates are inadequate and do not support a meaningful inspection program when the unit production rate is very high. And even when the sampling rate is satisfactory, it does not provide assurance that each and every part satisfies all dimensional requirements. In those situations where the manufactured part is intended to perform a critical function, individual inspection is mandatory.

Traditional devices for gauging fabricated parts, such as micrometers, height gauges and dial indicators all involve physical contact with the part. The gauging procedure requires a trained operator and is often difficult and time consuming. The widely used optical comparator technique in which a silhouette of the part is projected on a magnified scale onto a reference screen, also requires a trained operator and is subject to measurement errors due to eye fatigue, poor judgement, and other factors. The rate of gauging by an optical comparator is limited by the ability of the operator to see and evaluate the image on the screen with respect to a reference outline.

In order to overcome the limitations of gauging procedures which entail human operators, non-contacting electronic scanning devices have been devised, many of which employ an electro-optics device such as a vidicon tube or an image dissector tube. These tubes include a sensitive cathode and are adapted to scan an image of the object projected thereon to produce a video output that represents the dimension of the object being scanned. Among the advantages gained by the use of electronic scanning systems are the following:

A. Dimensions are obtainable at a point remote from the part being gauged without the need for physical contact therewith.

B. Measurements may be made to ascertain part dimensions which are not readily accessible.

C. Individual dimensions can be measured at very high speeds.

D. Because there is no need for a physical shift to take measurements at different coordinate positions on a single unit, there is effectively no dead time between such measurements. The time it takes to shift from one coordinate position to the next is limited only by the response time of the electronic scanner system and is usually in the order of a few microseconds.

E. The precision of measurement, expressed as a percentage of full scale, is independent of the size of the part being inspected. Compensation for variations in acceptable object size is effected simply by changing the magnification of the optical system which presents an image of the object to the scanner.

Despite the advantages inherent in electronic scanning systems for gauging machined parts and other fabricated objects, electronic scanning systems of the type heretofore known have not enjoyed significant commercial success, for such systems cannot be relied on to make accurate measurements. A major reason for this lack of success is that existing systems are incapable of compensating for distortions encountered in the electronic circuits of the systems and for non-linearities in the sweep and in the optics.

In an ideal scanning system in which there is zero distortion of the optics and in the scan parameters, and in which time is infinitely divisible with no ambiguity due to system noise and other variables, the system is theoretically capable of measuring the required dimension with any desired degree of accuracy or resolution. But since an actual system is inevitably subject to various distortions and ambiguities, noise and quantizing errors, the accuracy of the measurement is impaired thereby.

In our copending application, above-identified, there is disclosed an electro-optical system in which these distortions and ambiguities are eliminated, whereby the system is capable of gauging the dimensions of parts with a high order of accuracy. The present invention includes the features disclosed in the prior application, although it provides a somewhat different approach to the same problem. In the copending application, measurement is effected by an electronic caliper technique wherein the electronic scan acts to determine the distance between opposite edges of the parts in a manner analogous to that of a two jaw mechanical caliper whose jaws engage opposite edges. In the present invention, use is made of a coordinatograph technique in which the scanner examines the vicinity of the edges whose coordinates are to be determined.

SUMMARY OF THE INVENTION

In view of the foregoing, it is the main object of this invention to provide an improved electro-optical scanning system for measuring by means of a coordinatograph technique the dimensions of parts or assemblies thereof.

More particularly, it is an object of this invention to provide a measuring system of the above type which allows for a higher degree of statistical averaging of the video information gathered without sacrificing the operating speed of the system. In a scanning technique wherein the scan is used as a caliper, the scan must traverse a large portion of the image in which no metrological data exists. By eliminating the need to scan areas which are lacking in information, it becomes possible to reduce the time required for the individual scan by one or two orders of magnitude without reducing the information content thereof. Thus, a system entailing a scanning technique whose information density is high lends itself to numerous repetitions of the scan and allows integration of the data generated by statistical averaging techniques to reduce system noise without increasing the operating time required for measurements.

In the coordinatograph approach in accordance with the invention, the scanner is directed to look only in the vicinity of the edges whose coordinates are to be determined. In a typical case, the edge tolerance is of the order of a few thousandths of an inch over a dimension which is commonly between 0.100 and 0.500 inch. In the prior caliper approach, the scan would be forced to traverse the entire width of the dimension of interest, that is the entire 0.100 or 0.500 inch.

Thus in the coordinatograph technique, the scan need travel only the region in which the edge is expected to be found, which normally is no more than ± 0.005 inch. (Obviously, if the edge is not found within this region, the part contains a major defect). Instead of traversing 100 to 500 units of 0.001 inch each to make a caliper measurement, in the coordinatograph technique one traverses only ten of these same increments, reducing the required scan time by a factor ranging from 10 to 50.

It will be recognized that as the ratio of the allowed tolerance is reduced with respect to the dimension being measured, the effective efficiency of the coordinatograph system improves proportionately. As a result, the coordinatograph-type system can repeat each measurement 10 or 50, or even more times (depending upon the ratio of improved efficiency), and then use the integrated results of all these measurements to achieve a signal-to-noise improvement in the system performance, thereby significantly enhancing system accuracy. In practice, the coordinatograph approach, without increasing measurement time is capable of improving resolution from 3× to 10× compared to the caliper approach, thereby affording a much higher degree of measurement accuracy.

It is a further object of this invention to provide a "permanent" method of calibration which in most cases will eliminate the need for a two-dimensional calibration grid of the type disclosed in said copending application, as an operative element in the measuring procedure of the system. This greatly simplifies the optical configuration required for the system over that which is needed for an in-use grid calibrating procedure, and it also accelerates the effective system measuring speed by a factor of two.

Also an object of this invention is to provide a system of the above-type wherein the measurements which are carried out and the calibrations which are effected for each measurement are individually controlled by a stored digital program whereby under the command of the program, measurements can be performed anywhere within the field of view of the system. Within this field of view, no limitation exists as to the length of the dimension to be measured or its slope with reference to an arbitrarily determined set of coordinates.

In a system according to the invention, the digital program stores for each part the nominal coordinates of the dimension to be measured and the acceptable tolerance range for this dimension. The program determines whether the measuring system will act on a straightforward "go" or "no-go" basis to accept or reject the part, or whether the system will sort parts into separate categories depending on the tolerance band within which the controlling dimensions fall.

The number of dimensions which can be measured on a given part is limited only by the capacity of the memory which holds the program. When multiple dimensions are measured on a simple piece, the machine can be programmed to accept the piece when all dimensions lie within the assigned tolerances, or upon rejecting the piece for an out-of-tolerance dimension, to produce a signal indicating which dimension was found to be unacceptable. This signal can be used to sort parts into separate bins in accordance with the dimension found to be out of tolerance.

By using stored subroutines, the measuring system can be made to perform standard multiple measurements of the type appropriate to the inspection and measurement of machine or otherwise fabricated parts or assemblies. Thus by the use of a stored subroutine, one is able to find the coordinates and diameter of all holes visible in the field of view of the system. And by another subroutine one can determine the roundness of each of these holes. The conformance of the holes to any other desired shape whose perfect dimensions can be established as a reference can be determined by yet another subroutine. With further subroutines one can ascertain the concentricity of parts, the pitch diameter of spur gears and of threaded pieces as well as the tooth-to-tooth error of most hobbed parts.

Because of the flexibility of the electronic scan, the electro-optical measuring system can be programmed to use scan patterns that are optimized for particular measuring functions, such as determining the radius of curvature and the center of curvature of curved surfaces. For this purpose the system can establish the position of these centers of curvature in space and make measurements from these positions to other points within the system field of view.

To establish the fundamental metric of the system, it is necessary to develop a stable, high-precision relationship of transfer function between the voltage used to command the scan generator and the actual instantaneous position of the scan with reference to the image plane. With this relationship established, the instantaneous position of the scan is then determined by merely examining the value of the voltage fed to the scan generator. Using this technique, the sensing of a video edge (which indicates that the scan is crossing an image edge at the image plane) commands a readout from the circuit generating the command voltages for the scan generator. By proper control of the transfer function described above, these command voltages precisely determine the coordinates of the point of crossing of the image edge in the system's image plane. These coordinates, then, are the fundamental metric of the coordinatograph scanner.

The system can be used to perform several functions, and as an example, the following two functions can be carried out simultaneously or independently:

A. Making on-line, real time decisions for accepting, rejecting, and sorting measured parts.

B. Furnishing complete data showing the measured values of all parts examined to a properly programmed digital computer. Coordinated in this way, the measuring device and the computer can determine and control dimensional and tolerance trends that are occurring in the course of manufacturing the parts being tested within the acceptable band of tolerances. The data derived from such analysis can be used to initiate the resetting of machine tools, the changing or repairing of cutting tools, and in general, to predict and thereby obviate the production of parts having out-of-tolerance dimensions.

In the case of assembly operations rather than individual parts, the gauging problem is more difficult to solve by conventional means because in many cases the assembly process adds parts which obscure the area of the assembly that needs to be measured or inspected to insure that the overall assembly has been made properly. Frequently, because of this obscuration, the completed assembly cannot be fully inspected to insure that it has been properly assembled without first dismantling the unit. An automatic gauging device can be used to inspect partially completed assemblies to determine that all assembly operations prior to the inspection point have been made properly. If such inspection stations are introduced just prior to each assembly step which will obscure an area that requires inspection, the entire assembly can be fully inspected without the necessity for disassembly to examine obscured parts. It is therefore another object of this invention to provide means for measuring partially or fully completed assemblies to determine that they have been assembled properly up to the point where the measurement is made.

Briefly stated these objects are accomplished in an electro-optical system for gauging the dimensions of a machined part of other fabricated object or assemblies thereof to determine whether the part meets predetermined standards. The system includes an electro-optical scanner such as an image dissector tube having a photocathode onto which is projected an image of the outline of the part being measured. Scan voltage for the tubes are developed by a scan generator to create a scan whose shape, position, and length are controllable to define a scan path which traverses each edge of metrological significance.

Only one edge is scanned at a time, scanning being for the purpose of determining its X-Y coordinates. The system program is written solely in terms of coordinates accept/reject decisions being made on the basis of comparing the allowable tolerance of this coordinate measurement (or the dimension determined therefrom) with the actual value measured.

Calibration means are provided including a calibration grid whose image is projected onto said photocathode in place of said part outline, which means serve to modify the scan voltages to correct for the optical and electronic non-linearities of the system. The grid measurements can be used periodically to determine a long term correction matrix or, when required, the grid can be projected on the scanner face before each measurement to insure very low drift performance in a difficult environment.

OUTLINE OF THE DRAWING

For a better understanding of the invention as well as other objects and features thereof, reference is made to the following detailed description, to be read in conjunction with the accompanying drawing, wherein:

FIG. 1 is a schematic diagram of the optical arrangement for projecting an image of a part being gauged or of the calibration grid, onto the sensitive cathode of a scanner assembly in an electro-optical system in accordance with the invention for gauging the dimensions of parts;

FIG. 2 is a block diagram of the electronic system adapted to control the scan shape and position and to process the information contained in the video signal yielded by the scanner shown in FIG. 1;

Figure 5:
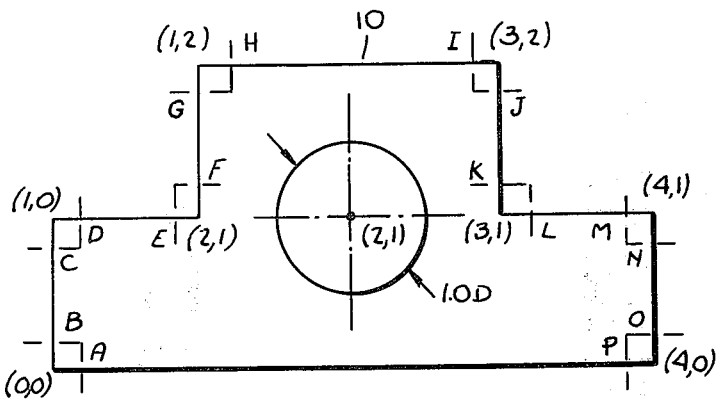
Figure 6:
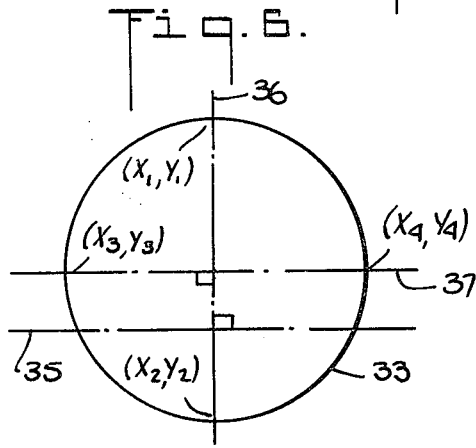
Figure 3:
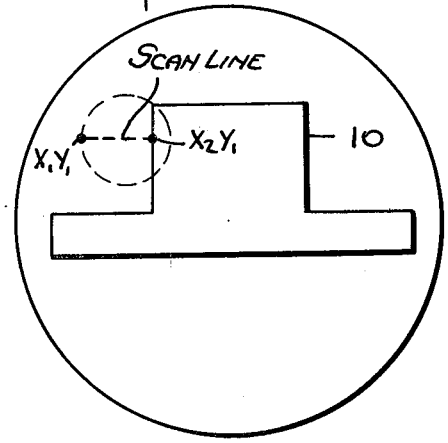
Figure 6A:
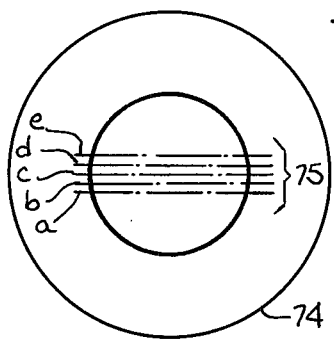
Figure 6D:
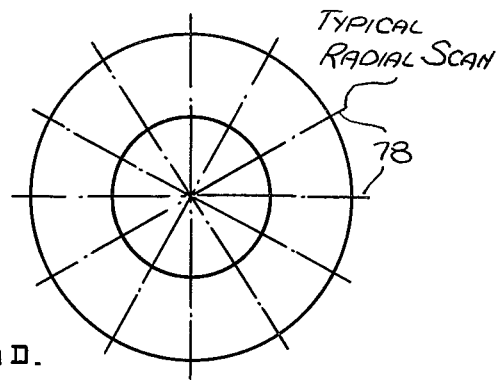
Figure 6B:
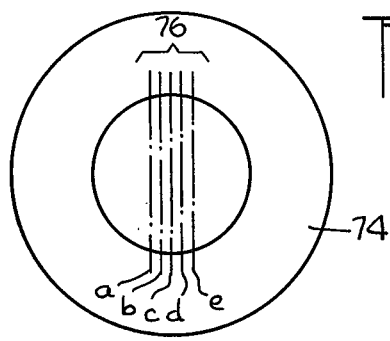
Figure 6C:
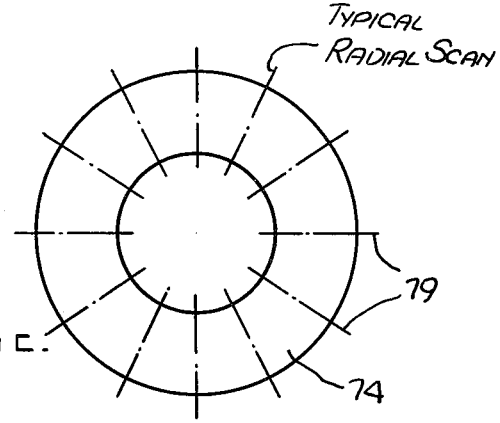
Figure 6E:
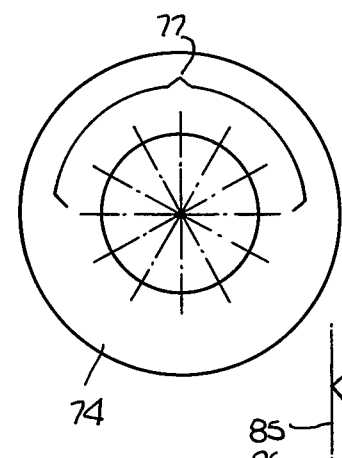
Figure 6F:
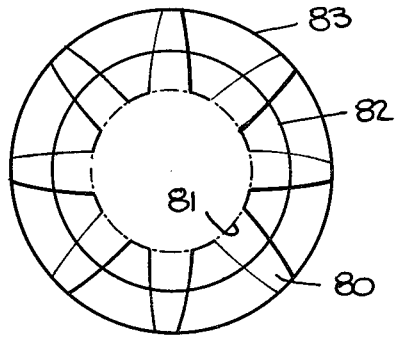
Figure 6G:
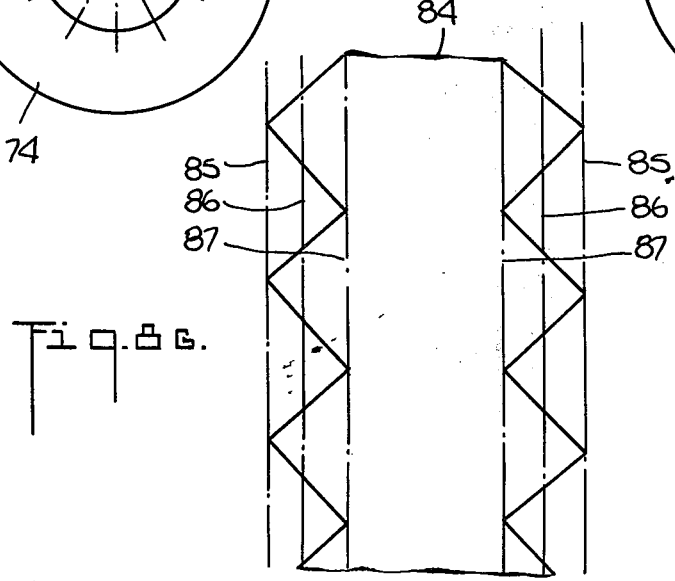
Figure 9A:
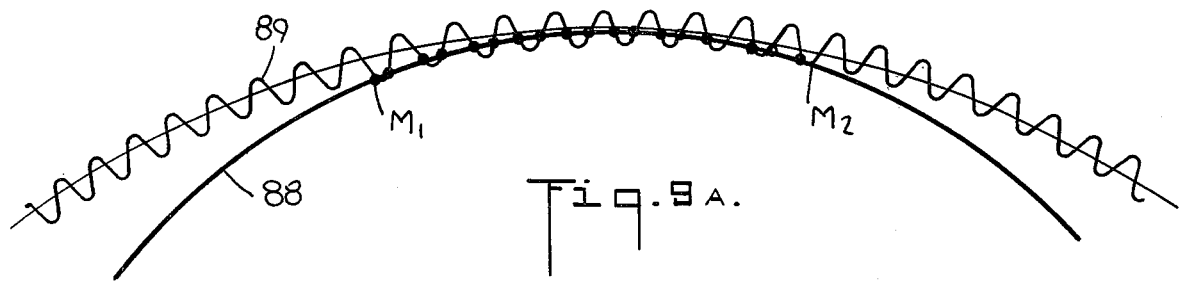
Figure 9B:
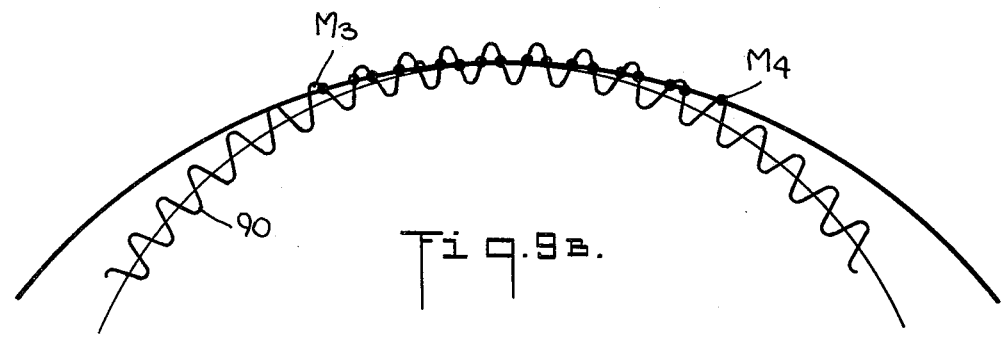
Figure 9C:
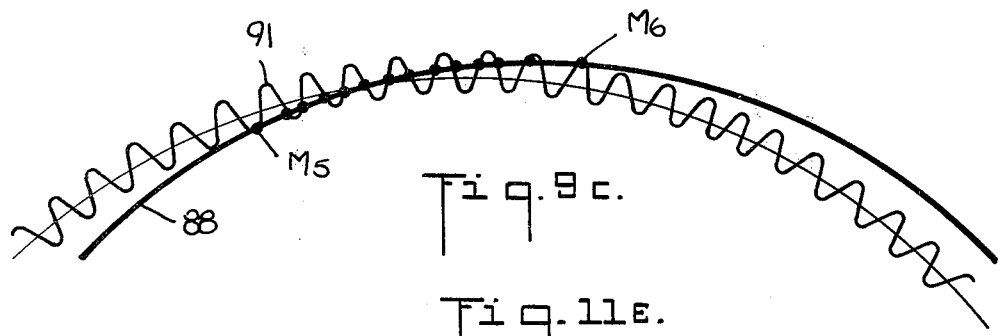
Figure 11E:
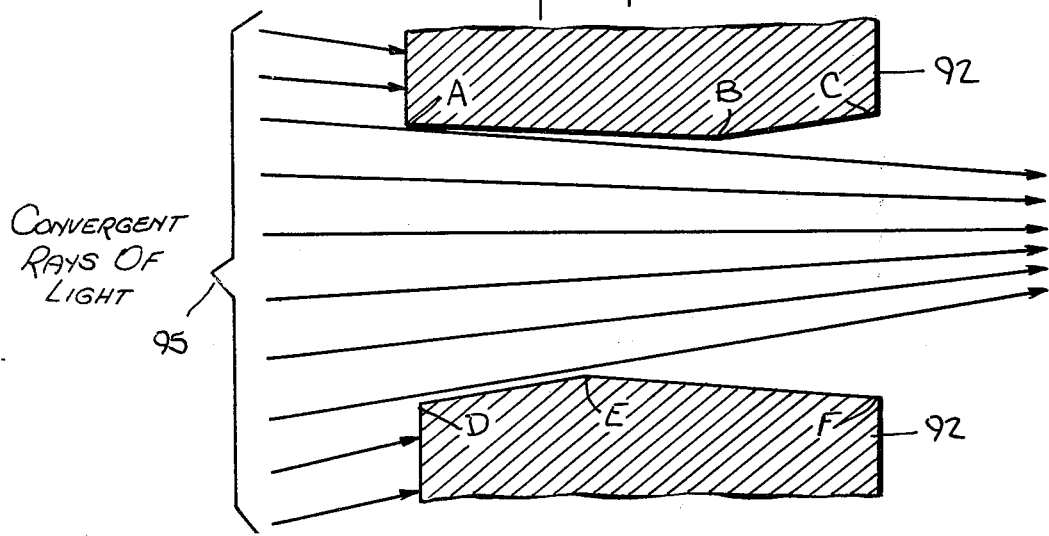
Figure 11A:
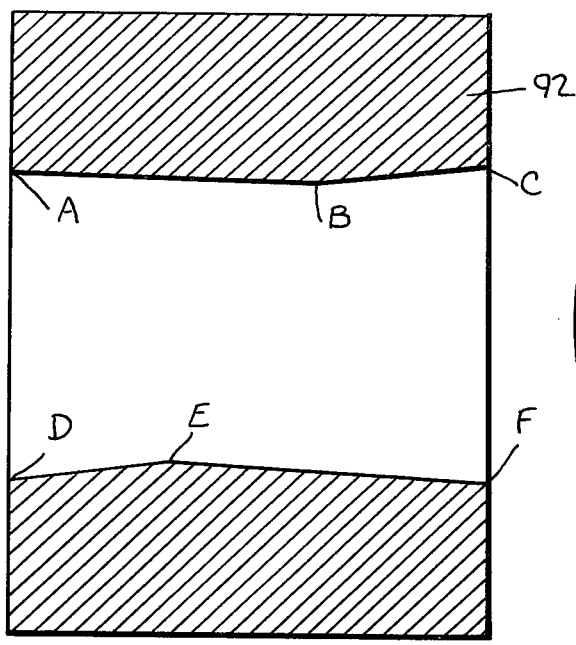
Figure 11B:
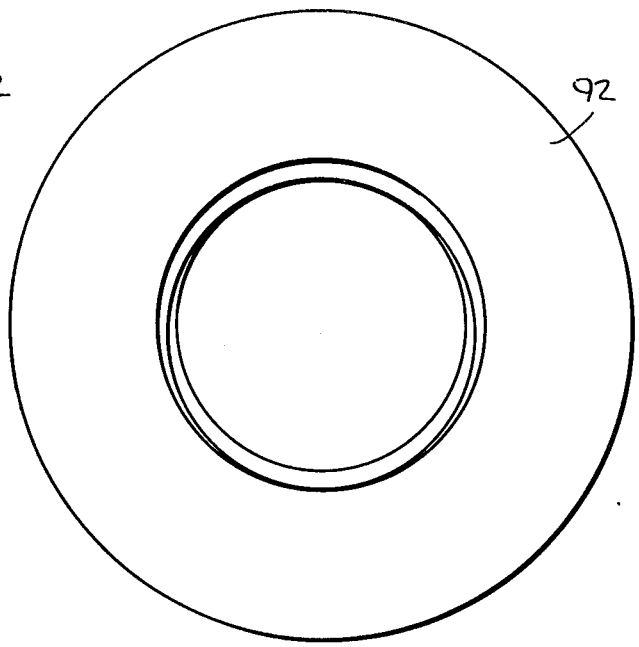
Figure 11C:
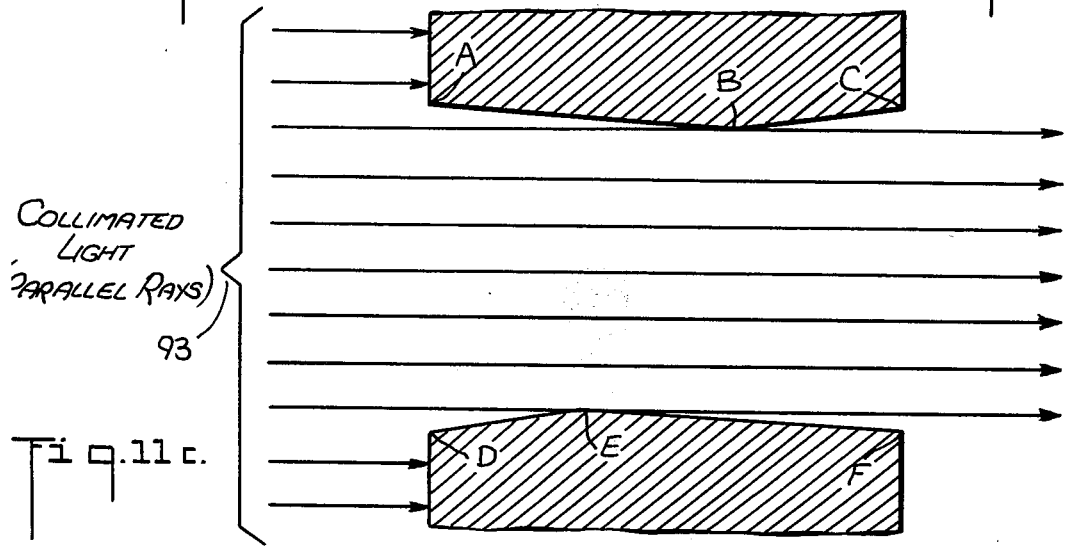
Figure 11D:
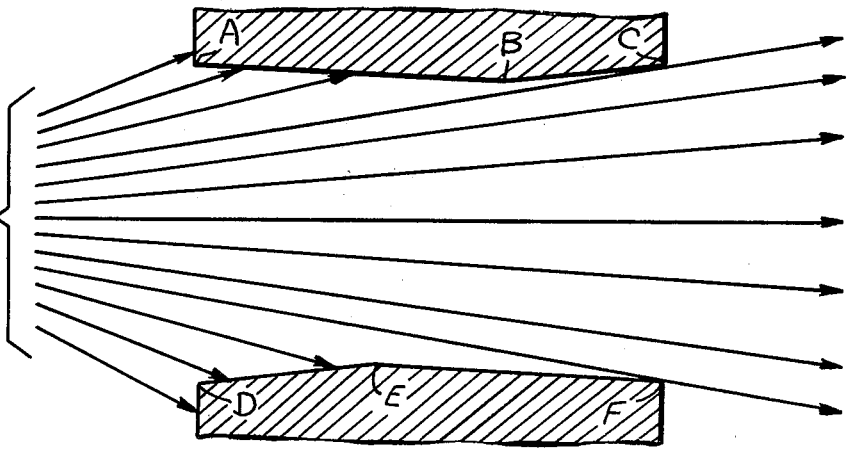

FIG. 3 graphically illustrates the image of a part being projected onto the face of the scanner and a scan being generated to examine one edge of the part; and FIG. 4A is an expanded view of the scan line;

FIG. 4B shows the voltage waveform required to generate the scan shown in FIG. 4A;

FIG. 5 shows the same part, 10, with a chart showing how the individual dimensions are called out for measurement;

FIG. 6 shows a typical measurement subroutine;

FIG. 7 shows a calibration grid for the system;

FIGS. 8A to 8G illustrate the manner by which certain part dimensions are examined by special subroutines;

FIGS. 9A to 9C illustrate the manner by which the radius of curvature and the center of curvature may be determined by other special subroutines;

FIG. 10 shows schematically the scanning arrangement for tracking moving parts to be measured;

FIGS. 11A to 11E illustrate a collimated light technique to control the illumination of a part to be measured; and FIG. 12 illustrates a preferred technique for measuring the thickness of a transparent object.

DESCRIPTION OF THE INVENTION

THE OBJECT SCANNER

Referring now to FIG. 1, there is shown schematically an arrangement in accordance with the invention for examining an object 3 in order to generate video information from which one can derive the measurement data of interest. Object 3 is shown in the form of a machine-made part having a generally rectangular shape whose upper edge is provided with a tab extension. It will be appreciated that this shape is merely by way of simplified illustration and that in practice the object may have a much more complex configuration.

Object 3 is illuminated by a suitable high-intensity light source 1 whose rays are focused on the object by a lens 2. Object 3 is interposed in the path extending between light source 1 and the sensitive photocathode of a scanning assembly 11; hence it is only the profile or contour of the object which is projected. The multitude of projected rays is typified by light rays 4 and 5 which are directed toward a lens 7 and emerge therefrom as rays 8 and 9. These rays impinge on the light-sensitive surface of scanner assembly 11 to create thereon an image 10. In a photo-multiplier, this surface takes the form of a photocathode. The projected image 10 is a replica of the profile of the object 3 and therefore takes the form of a silhouette.

Interposed between object 3 and lens 7 is an inclined, semi-reflecting plate 6 functioning as a beam splitter that separates the rays from the object into two beams, one passing successively through plate 6 and lens 7 and being directed toward the scanner assembly, the other beam being reflected by the plate and being disregarded. In practice, in lieu of a plate, one may use a beam-splitter cube composed of two right angle prisms joined together, the hypotenuse of one prism being coated with a semi-reflecting layer. A thin semi-reflecting plate is sometimes objectionable because of ghosting or astigmatism unless used with parallel light rays.

Also associated with beam splitter 6 is a second light source 20 whose light is focused by a lens 19 onto the rear of the beam splitter through a transparent calibration grid 18, the rays impinging on the beam splitter being represented by rays 16 and 17. When light source 20 is turned on and light source 1 is turned off, the illuminated grid formed of intersecting equispaced vertical and horizontal lines is presented to the photocathode of scanner assembly 11. Thus, the photocathode of scanner assembly 11 sees either the silhouette of the object being examined or the calibration grid, depending on which light source is active.

The photomultiplier included in the scanner assembly is preferably of the image dissector type, such as that described in my prior Pat. No. 3,593,286 wherein the photocathode, in response to incident light, emits photoelectrons which are projected onto the plane of a defining aperture. Operatively associated with this aperture is an electron multiplier and a deflection system for deflecting the electron image over the defining aperture in a manner whereby the various portions of the image are examined in a desired sequence.

Thus, the photomultiplier is provided with a set of deflection coils, one for vertical and the other for horizontal deflection, and a focusing coil. A scan generator 12 supplies deflection currents to the set of coils and a focus generator 13 supplies current to the focusing coil. A high voltage supply 14 connected to the photomultiplier, supplies the required operating potentials thereto. The output of scanner assembly 11 is fed to a pre-amplifier and wave shaper 15 whose video output contains the information to determine the time of crossing of the scan and the examined portion of the silhouette of object 3 or the calibration grid 18, depending on which light source is operative.

THE SCANNER CONTROL SYSTEM

Referring now to FIG. 2, there is shown the electronic system that is adapted to control the scan shape and position and to process the information contained in the video signal yielded by scanner assembly 11. The video output of scanner assembly 11 is first processed in a video pre amplifier 15 and a wave shaper 16 to generate start and stop signals capable of gating a high precision clock 17 which produces periodic pulses at a predetermined constant repetition rate.

The output of clock 17 is fed through the rate control circuit 28 (whose function will be covered later in this section) to a set of counters, namely an "X" counter 26 and a "Y" counter 27. These counters in turn each control a digital-to-analog converter (D/A), counter 27 controlling D/A converter 25 and counter 26 controlling D/A converter 24. The output of each D/A converter is directly proportional to the number being fed to it by its associated counter. Thus as the counter value is advanced by input pulses from clock 17 thru rate control circuit 28, each clock pulse advances the counter one step and advances the associated D/A converter one minimum increment (normally called a least significant bit, or LSB).

The outputs of the D/A X converter 24 and of D/A Y converter 25 are respectively fed into an X summing amplifier 20 and a Y summing amplifier 21. Also fed into summing amplifier 20 is another voltage derived from a D/A converter 32 whose digital value comes from a computer-controlled storage register 31 to provide the voltage that determines the X scan starting position. Also fed into summing amplifier 21 is another voltage derived from a D/A converter 23 whose digital value comes from a computer-controlled storage register 22 to provide the voltage that determines the Y scan starting position.

The system function is as follows. When the computer program generates a command to measure the "next" dimension, the computer first reads out the starting coordinates for the scan for that dimension. These are read out into the X register 31 and the Y register 22 to set the associated D/A converters 32 and 23 to the required value to establish the beginning of the scan. Thereafter, clock 17 is enabled to provide an input to X counter 26 and Y counter 27 thru rate control circuit 28 so that the scan advances in a linear fashion one least-significant increment at a time for each clock pulse into the counter.

FIG. 3 shows a typical scan of part image 10 in which only horizontal scan motion is required. As best seen in FIG. 4A, an enlarged section of FIG. 3, the scan proceeds from point X1-Y1 to point X2-Y1 to determine the coordinates of point X2-Y1 which is the edge of interest. The X portion of the scan is shown in FIG. 4B where the scan drive voltage Vs starts at a value corresponding to X1 and proceeds through a distance $\Delta X$ to drive the scan until the scan at X2 has intersected the edge of interest. This intersection thereupon stops the scanning process and commands a readout from X counter 26 to the computer. This readout which corresponds to $\Delta X$ is the numerical readout of X counter 26 and is supplied to the computer through $\Delta X$ coordinate data register 29. A similar readout for Y information is supplied to the computer through $\Delta Y$ coordinate data register 30 coupled to Y counter 27. The scan shown in FIGS. 3, 3A and 4 is in the horizontal direction and therefore does not require any change in the Y direction throughout the scan period.

By simply feeding the output of clock 17 into either X counter 26 or Y counter 27, horizontal or vertical scans can be obtained. In order to obtain scans at any other angle except the simple horizontal and vertical direction, it is necessary to change the ratio of the pulse rate feeding the two counters. This is achieved by the rate control circuit 28. This circuit is set by the computer using input information which determines the direction (that is the angle) at which the scan should proceed. From this, information is fed by the computer into the rate control circuitry to change the ratio of the pulse count feeding into the two counters.

After the scan initial position and motion requirement information have been properly added together in the X summing amplifier 20 and the Y summing amplifier 21, the summed information is then used to generate a deflection current for the X coil in scanner assembly by an X scan driver 18 and for the Y coil by a Y scan driver 19. The scanner then generates the scan, starting at the appropriate point and traveling in the required direction, until it finds the edge being searched for. The video information containing this edge is processed by video preamplifier 15 and video amplifier-shaper 16, and the latter in turn generates a STOP command to clock 17 stopping the scan with the appropriate count in counters 26 and 27.

FIG. 5 shows the manner in which the image of part 10 would be scanned in order to find the coordinates of the eight corners defining the outline of the part. Each coordinate is given its appropriate Cartesian number pair in FIG. 5. The scan used would be directed to the regions labeled A-B, C-D, E-F, etc., through O-P. Communication between the person "setting up" the coordinatograph and the actual computer controlled operation thereof would be by means of a chart similar to that shown in FIG. 5. On this chart each of the scans used to find the edges associated with the corner coordinates are labeled from A thru P as they are on the associated figure. The coordinates of each of the scan intersections are then chosen as shown.

The magnitude of the increment used to move the scan from the nominal value such as 0 to the scanning position of 0+ or 0− can be read in as a single number on the chart to be used for measurements of all coordinates of the same part, or a separate column can be made on the chart for each of the increments so that the scan displacement can be optimized for each coordinate.

The chart must also call out the allowed tolerance in both X and Y, the computing subroutine that may be required for the dimension being measured, and finally the disposition subroutine which applies. The disposition subroutine normally is a decision on how the part should be sorted. In many cases, this is a simple accept/reject decision: in others there is a requirement for sorting by magnitude and type of dimensional error: and in still other cases there may be a printout providing hard copy information on certain types of errors.

FIG. 6 shows a typical subroutine that would be called under the computer subroutine column. The one shown in FIG. 6 is required to determine the center, the X diameter and the Y diameter of a circle. Since neither the precise position of the center nor the precise diameter of the circle is known ahead of time, it is necessary to first find the center of the circle and then the length of the X and Y intercepts passing through this center. The technique used is to draw a chord at any convenient point on the circle. This is done by generating a chord such as scan line 35. A perpendicular bisector 36 is erected to this chord. This passes through the center of the circle, and therefore in accordance with well known geometric laws the distance between its intercepts represents the Y diameter. A perpendicular bisector 37 is erected to this Y diameter. It also passes through the center of the circle, and its intercepts represent the X diameter. Calling up a subroutine of this sort will then determine the position and the diameters of the "1" circle shown in FIG. 5.

FIG. 7 shows a simplified calibration grid for the system. It consists of seven lines extending horizontally and seven lines extending vertically. The actual calibration grid for the system consists of 64 similar lines, equally spaced. In practice, the calibration grid could be black lines on a clear background, clear lines on an opaque background with any ratio of black line widths to clear line width, or even a checkerboard pattern or a set of parallel lines which would first be used to calibrate the system for scanning in one direction, and then be used to calibrate it for scanning in the orthogonal direction.

The calibration procedure consists simply of commanding the system to scan each horizontal and each vertical line once per block, conceptually requiring only 56 scans in the horizontal direction and 56 scan segments in the vertical direction for the calibration grid shown. The calibration program requires that the system read out from the appropriate counter (the X counter 26 when scanning the X direction, or the Y counter 27 when scanning in the Y direction) the number which is contained in the counter at the time of intersecting the appropriate grid line in each block. The calibration program subtracts each of the numbers associated with a grid line from those numbers associated with the adjacent grid lines. Differences between these values (that is the second differences) are stored as calibration corrections. The calibration procedure is repeated using these calibration numbers as corrections on the scan start information fed in for the X scan to register 22 and for the Y scan to register 31. The process converges rapidly, and the result is a series of correction numbers which are stored in the computer and fed to the scan control circuitry thru registers 22 and 31 for linearizing the scan during all subsequent measurement operations.

For the most accurate application of the coordinatograph, this degree of correction is frequently not sufficiently precise. Non-linearities can arise between correction points. These are corrected by an interpolation process that takes place after the individual measurement is made. The intersection of the scan with the edge of interest commands a readout from the counters thru data registers 29 and 30. This readout contains the correction made on the scan start position by the stored calibration matrix, but the scan is not corrected between discrete calibration points. Thus, the second order non-linearities which arise between calibration points will remain. However, when the readouts from the counters is obtained, a further interpolation correction is computed. This results in a further increase in effective system linearity by as much as 10×, providing, with the 64 × 64 calibration grid used in actual practice, a system linearity of the order of one part in 40,000.

Note that we are generating calibration information by determining first and second differences between grid line interceptions when scanning the image of a very accurate grid. This data is used to establish a quantized calibration matrix (nominally 64 × 64) for the entire image plane in the embodiment of the invention described above.

However, the same first and second difference data can be used to provide calibration in a continuous form throughout the entire image plane. A technique which is well known to the art to accomplish this is based on the generation of a polynomial expression in X and Y which is used to describe mathematically the non-linearities to be corrected. In cases where these non-linearities can be described by a relatively short polynomial (which normally means no terms higher than 5th order), this method has been used to provide linearity corrections that approach a part in 3,000, where a higher order determination increases the achievable linearity until it approaches the part in 10,000 available from the raw data. Where these conditions can be met, converting the first and second difference data generated by scanning the image of the high precision grid to the form where it will provide the value of the coefficients of the defining polynomial is a relatively straightforward problem in numerical analysis, and it can be performed in minutes on a commercial minicomputer.

A second method for providing relatively continuous corrections for the entire image plane based on data generated from first and second differences as described above requires a series expansion of the nonlinearity function in the vicinity of points chosen in the field being linearized. This procedure is based on a well known mathematical technique by which any function can be generated if its value and the value of all of its derivatives are known at one point. In practical applications, it normally is not necessary to establish the value of more than the first few derivatives of the function; simplicity in manipulation can often be achieved by establishing the value of the function and its defining derivatives at a few points within the field of interest. This method has the disadvantage of requiring a computational cycle for correcting non-linearities for each measurement made. The time required to accomplish this will frequently reduce the overall operating speed of the system.

As stated above, in actual practice, the calibration grid will have many more vertical and horizontal lines than those shown in FIG. 7. A convenient practical number is 64 horizontal lines intersecting 64 vertical lines to define a grid which when projected on the photocathode of the scanner assembly, will generate an image whose dimensions are approximately 1 inch by 1 inch, and in which the grid lines are spaced 0.016 inches apart.

With each of these grid lines generating an image of about 0.003 inches wide, the deflectable photomultiplier used will determine the position of the leading and trailing edges of each line to a precision of appreciably greater than 0.0001 inches, using a scanning aperture with a physical diameter of 0.0008 inches. This requires the use of integration and edge-enhancement; both techniques are well known in the art.

With a basic linearity of the scanner plus the optical assembly in the order of 0.25%, calibration effected by a 64 by 64 line grid of the type described, using edge enhancement techniques to define edge position, will result in a system that can be calibrated to measure to the basic accuracy of the grid ±0.003%.

Inasmuch as grids are commercially obtainable with accuracies in excess of 0.001%, the accuracy of the present system with a grid of this commercially available is better than .004%.

SPECIAL SUB ROUTINES

FIGS. 8A to E illustrate the ability of the scanning system to examine the end of a cylindrical part 74 whose internal bore diameter and exterior diameter represent the ID and OD of the part. Let us assume that it is desired to determine the coordinates at the center of the circular bore and its ID. To find the ID, a series of horizontal search scans, such as those represented by numerals 75a to e in FIG. 8A, are run across the nominal center, starting with scan 75a just below the lowest position allowed by an acceptable tolerance and ending with scan 75e just above the highest allowed position. The X diameter of the bore is determined by the largest dimension measured in this search procedure. The X coordinate of the center of the bore is represented by the position of the bisector of the diametrical distance so determined.

In a similar manner, the Y coordinate and Y diameter of the bore is found by a group of scans 76a to e, as shown in FIG. 8B. The coordinates of the center of the bore then are the intersection of the largest X diameter and the largest Y diameter which have just been measured.

The circularity of the bore can be determined by running a large number of diameters 77 through the bore center just established, as shown in FIG. 8C. Variations in intercepts with the part across any of these diameters indicate a departure from circularity. In a similar manner, a deviation from symmetry of the outer diameter of the part and its total indicator readout (TIR) can be measured as shown in FIG. 8D by running a set of diameters 78 through the center by the procedures mentioned previously, and determining the lengths of these diameters as they intersect the outer surface of the part.

The concentricity of the inner diameter and the outer diameter can be determined by running a series of radial scans 79, as shown in FIG. 8E, across the ID and OD to measure the wall thickness of the part. Variations in thickness are directly indicative of the concentricity of the ID and OD.

Referring now to FIG. 8F, there is shown the undulating outline of a very coarse gear which is to be measured. Circle 81 represents the root diameter of the gear 80, circle 83 represents the OD of the gear and circle 82 represents the nominal pitch diameter of the gear. A scan place on this pitch diameter can measure the tooth-to-tooth spacing of the gear and the various defects pertaining to a gear configuration which are based on tooth-to-tooth error.

In a similar fashion, one may make measurements along the pitch diameter of a threaded part such as a screw which in FIG. 8G is represented in longitudinal cross-section. The parallel lines 85 which touch the peaks of the threads, represent the OD of the screw. The parallel lines 87 which touch the troughs of the threads, represent the root diameter, while the parallel lines 86 which intersect the threads, represent the pitch diameter. A scan running along lines 86 will measure variations in the threaded contour along this pitch diameter. This measurement can be carried out while the part is held stationary or while it rotates about its longitudinal axis. The latter measurement will afford a complete history of the variations in thread contour along the pitch diameter throughout the entire length of the threaded part for 360° of rotation.

Referring now to FIGS. 9A, 9B and 9C, there is illustrated another measuring technique made possible by the flexibility inherent in a deflectable photomultiplier scan. Curve 88, in these figures represents either the ID or the OD of a part whose radius of curvature and whose center of curvature is to be established. The exploratory waveform in FIG. 9A is represented by waveform 89, that in FIG. 9B by waveform 90 and that in FIG. 9C by waveform 91. These exploratory waveforms are constituted by a scan having a known radius of curvature and a known center of curvature. Superimposed on this curved scan is a high frequency modulation component.

The exploratory scan and the unknown curve 88 in FIG. 9A will have the same radius and center of curvature only when all of the high frequency cycles of the modulation component are intersected symmetrically by the curve being measured. However, curve 89 of the exploratory scan is at variance with the curve 88 being measured. Curve 89 has a larger radius of curvature and the intersection with curve 88 therefore starts and stops near the bottom of the high-frequency modulation component, as indicated at points $M_1$ and $M_2$.

Referring now to FIG. 9B, it will be seen that exploratory curve 90 has a smaller radius of curvature than curve 88 of the part being measured, and that its intersection with the part curve starts and stops at the top of the high frequency modulation component, as indicated by points $M_3$ and $M_4$.

In FIG. 9C, the exploratory curve 91 has the proper radius of curvature relative to the curve 88 of the part being measured, but its center is displaced in space from the center of part curve 88. Under these circumstances, the intersections with the high frequency modulation component start at the bottom thereby, as indicated by point $M_5$, and stop at the top, as indicated by point $M_6$.

In all of the examples shown in FIGS. 9A, 9B and 9C wherein the exploratory curve deviates in terms of radius of curvature or center of curvature from the curve of the part being measured, the extent and direction of this deviation is determined by techniques well known in the art for generating an error signal of corresponding magnitude and sense. This error signal acts to control a closed servo loop to change the radius of curvature and the center of curvature of the exploratory scan to match those of the unknown type.

The high-speed measurement system described herein is particularly useful in the following situations:

A. When it is necessary to make a large number of measurements on a complex machined part such as an eccentrically-shaped cam or machine casting.

B. When multiple measurements of the same dimension are required in a high speed production line. An example of this situation is a line producing roller bearings at a rate of 5 per second and where inspection requirements dictate measurement at several positions along the length of the roller.

C. When measurements of implied dimensions are called for, such as the pitch diameter of a thread or gear. In this situation, a reference surface must be carefully erected. This reference surface must be carefully placed with respect to the unknown object, and measurements then made to specified portions of the reference surface. At present, physical wires are used to generate the reference surface. This entire procedure can be performed by a system according to the invention, under an appropriate computer program control, including the generation and use of "electronic wires" as references.

The surface of the part presented to the system must represent the dimensions to be measured and it must therefore be free of chips and other machining residue. Other than the requirement for cleanliness, no other special surface preparation is necessary and the system will operate with equal ease on parts whose surfaces are either brightly polished or have a dull or a black anodized finish.

PATTERN RECOGNITION AND TRACKING

It is possible to use the scanner 11 and its associated optics for pattern recognition purposes in accordance with the technique disclosed in my Pat. No. 3,593,286. In this patent a deflectable photomultiplier tube is used to provide a scan of an optical image of a pattern to establish the degree of similarity between the pattern and a reference pattern. Thus scanner 11 functions both to effect dimensional measurement of a part and for pattern recognition. This dual use of the scanner requires only a relatively small increment in the electronics associated with the system and yet affords the following additional features which are of great value in a device for measuring parts:

A. The part being measured need not be oriented precisely in order to perform the desired measurements. With the scanner functioning as the input device to a correlator in the manner disclosed in my earliest patent (see FIGS. 4, 5 and 6), the video information generated thereby can be used to align the scan to the displaced or rotated image of the part to be measured.

No mechanical movement is entailed in the operation, for scan alignment is effected electronically as described in my earlier patent. With the scan aligned in this manner, the coordinates of the measuring scan are offset and rotated by applying thereto the same offset and rotation correction voltages developed by using the scanner in a correlating mode. As a result, the measuring scan pattern is rotated and translated to the degree appropriate for the displaced image in its field of view.

B. By the use of image motion-compensation techniques, as described in connection with FIG. 11 and 12 in my earlier patent, one can track an object moving through the field of view. This is of particular value in making measurements on parts conveyed on a moving belt, for measurement can then be made in the part during the entire period the part remains within the field of view of the system. It is also useful in measuring parts that are allowed to rotate by rolling across this field of view, thereby facilitating measurement of the diameters of balls or cylinders and making it possible to carry out similar measurements that should be identical regardless of the orientation of the part.

By this tracking technique, one can measure out-of-round conditions and other deviations from symmetry without the need to determine the total indicator readout or similar readings. The simplest techniques for making this measurement is illustrated in FIG. 10 wherein part 69, moving across a flat surface 66, is observed by two separate scanners 67 and 71.

One scanner 71 which responds to an image generated by light rays 73 projected thereon by lens 72, tracks the part while it is moving across the field of view in the manner described in my earlier patent. The other scanner 67, using lens 68 and light rays 70 for measuring purposes, is slaved to the tracking scanner by means of inputs supplied from the tracking scanner to control input 54-1 and 54-2 in FIG. 5.

When slaved to track in this fashion, the measuring scanner 67 sees the image of the moving part stabilized within its scan, and it makes measurements just as if there were no actual movement of the image. It is to be noted that the nature of the calibration technique disclosed herein allows the measuring scan to be calibrated at each new position of the scan merely by using a standard sample and a hold circuit between the tracking scanner/correlator and the control input 54-1 and 54-2 (FIG. 5) of the measuring scanner.

When calibrating, the sample and hold circuits are put in the "hold" mode, so that calibration can take place with a static scan at approximately the position at which it will be for measurements. Then the sample and hold circuit is put in the "sample" mode wherein the measuring scan "catches-up" with the tracking scan, thereby stabilizing the moving image with respect to the measuring scan. With circuits of the type well known in the art, the time constants are such that the hold mode for calibration and the "slewing" mode for tracking can be accomplished with sufficient rapidity to permit the overall system operation to proceed at its normal rate of measurement.

ILLUMINATION TECHNIQUES

It is frequently desirable to be able to choose different planes in object space to generate the image to be measured on the face of the scanner assembly. Certain techniques have heretofore been employed to do this to a limited extent. In particular, collimated light can be used to afford a limited amount of control, as will now be explained in connection with FIG. 11. FIG. 11-A is a hollow cylinder 92 of tubular configuration shown in cross section. FIG. 11-B is the same cylinder shown in end view. The inner diameter is not a perfect cylinder; the upper section is somewhat thicker at the point B, and the lower section is somewhat thicker at the point E.

As shown in FIG. 11-C collimated light 93 used to measure the inner diameter of this cylinder would be intercepted at points B and E. The image generated by passing the collimated ray bundle through the inner diameter of this cylinder would indicate an inner diameter that is smaller than the left-hand diameter (AD) or the right-hand diameter (CF).

It is frequently necessary to obtain either diameter AD or diameter CF while illuminating the inner diameter of the cylinder with a light from the left of the cylinder. The image is to be viewed with a scanner placed on the right of the cylinder, with suitable optics between the right-hand side of the cylinder and the scanner to generate the required images. In FIG. 11-D, to see diameter CF while illuminating the cylinder from the left, it is necessary to cause the light rays 94 to diverge in a controlled manner. The angle of divergence can be determined geometrically. The divergence must be great enough so that the rays which exit from the right side of the ID of the cylinder have been intercepted by the diameter of interest, namely the diameter CF, and not by a diameter which is somewhat leftward of the diameter of interest.

In a similar fashion, to choose the diameter AD which is on the illuminated face of the cylinder, it is necessary to use illumination with a controlled degree of convergence as illustrated in FIG. 11-E. The amount of convergence can be determined geometrically; the requirement being that the rays 95 exiting from the right side of the ID of the cylinder be intercepted only by the diameter AD and by no surface to the right of AD.

Another measurement problem that arises in practice for which no practical solution exists today is that of measuring the thickness of a transparent material such as a glass slab 97 as shown in FIG. 12. If the physical configuration of the material to be measured permits it, techniques similar to those used for metal can be used. These include micrometers, height gauges, etc. However, it is common to generate glass shapes with highly convoluted and frequently closed wall configurations. The problem is peculiarly aggravated by the fact that the generation of these shapes is normally done by a blowing or sagging process during which it is extremely difficult to control the wall thickness of the glass being worked.

It is necessary, in order to insure the overall strength of the resulting object, to determine the wall thickness of the finished item. A method of making such measurements in a non-destructive manner under practical production conditions in accordance with the invention involves directing an incoming ray of light 96 toward the slab of glass 97, whose thickness is to be measured, so that two reflections are generated. One reflected ray indicated by numeral 99, results from a first surface reflection, and the second reflected ray identified by numeral 98, is a second surface (often called ghost) reflection.

It is quite obvious from examining the geometry shown in FIG. 12 that for a given angle between incoming ray 96, and the first surface of the slab of glass 97, the distance between the two reflected rays 98 and 99, is a direct measure of the thickness of the slab. The scanning technique for measuring disclosed hereinabove is directly applicable to measuring the distance between these reflected rays in order to provide a feasible commercial method of measuring glass thickness.

While there has been disclosed a preferred embodiment of a system in accordance with the invention, it will be appreciated that many changes may be made therein without departing from the essential spirit of the invention.

We claim:
1. An electro-optical scanning system for gauging the dimensions of a machined part and other fabricated objects and assemblies to determine whether the part meets predetermined manufacturing standards, said system comprising:
   A. an electro-optical scanner having a light sensitive face;
   B. optical means to project an outline of a part to be measured onto said face;
   C. a scan generator operatively coupled to said scanner to produce scan voltages generating a scan whose position and length are controllable to define a scan path which traverses those edges of the image of the part outline whose coordinates are to be found, whereby the scanner yields a video signal from which said coordinates can be determined by examination of the scan drive command;
   D. a reference value storage register;
   E. an input information matrix coupled to said controllable scan generator and to said register to supply, in regard to each of the several coordinates to be determined information to said scan generator for producing a scan along a scan path appropriate to each coordinate and to supply to said register information regarding the coordinate values appropriate to the nominal dimensions of each part dimension;
   F. means comparing the measured coordinate yielded by the system for each measuring scan with the reference value in said register representing the related nominal coordinate, to produce an output signal indicative of the disparity between the part coordinate measured and the nominal coordinate; and
   G. means for computing the distance between two sets of measured coordinates to determine the measured dimension between said coordinates, and
   H. means for comparing this computed dimension with a reference value for this dimension in a reference register representing the related nominal dimension, thereby producing an output signal indicative of the disparity between the part dimension computed and the nominal dimension.

2. A system as set forth in claim 1, further including reference means to modify said scan voltages to correct for the optical and electronic non-linearities of said system with respect to each dimension measured.

3. A system as set forth in claim 1, further including a calibration pattern, means to project in place of said part outline an image of said calibration pattern onto said face to produce an image thereof covering the entire field of view, to define a reference coordinate for each of the coordinates to be measured, and means to compare the coordinate to be measured with the related reference coordinate to determine the differential error introduced by the optical and electronic non-linearities of the system and to correct the voltage produced by said generator to compensate therefor.

4. A system as set forth in claim 3, wherein said means to project an image of said calibration pattern in place of said part outline, is constituted by a beam splitter, means to direct an illuminated outline of said part onto one side of said splitter whereby one of the resultant beams is projected onto said face, and means to direct an illuminated image of the calibration pattern onto the other side of said splitter, whereby one of the resultant beams is projected onto said face.

5. A system as set forth in claim 1, wherein said scanner is constituted by an image dissector tube whose face is formed by a photocathode, said tube including vertical and horizontal deflection means responsive to said scanning voltages.

6. A system as set forth in claim 1, wherein said information matrix is formed by a mini-computer and associated memory dedicated to said system.

7. A system as set forth in claim 1, wherein said matrix supplies information to said register regarding the tolerances of said coordinates to be measured, and said comparison means provides an output signal which indicates whether the coordinates measured is acceptable with respect to the related tolerance or is to be rejected.

8. A system as set forth in claim 7, wherein said matrix supplies information to said register with respect to various levels for sorting by coordinate variation and said comparison means provides a signal indicative of the sorting level to which the measured coordinate variation is applicable.

9. An electro-optical scanning system for gauging the dimensions of a machined part or other fabricated objects or assemblies to determine whether the part meets predetermined manufacturing standards, said system comprising:
A. an electro-optical scanner having a sensitive face;
B. a two-dimensional calibration pattern;
C. optical means to project either an outline of said part onto said face or an image of said calibration pattern thereon which covers the entire field of view;
D. a scan generator operatively coupled to said scanner to produce scan voltages generating a scan whose shape, position and length are controllable to define when the calibration pattern image is present, a scan which travels a vectorial path set up to duplicate the vectorial path required to measure a coordinate of interest, and when the part outline is present, a scan which travels a test vectorial path, whereby the scanner output in the one instance represents a calibration path, and in the other a coordinate measuring path;
E. correction means coupled to scan generator and responsive to said calibration to modify said scan voltages to correct for the optical and electronic non-linearities of said system with respect to the coordinate measured; and
F. means responsive to said coordinate measurements or computations based on said coordinates to compute dimensional values; said means to determine whether said coordinates or dimensions satisfy the manufacturing standard.

10. A system as set forth in claim 9, wherein said correction means includes means responsive to said calibration count to correct the scan such that the coordinates commanded by the scan generator voltage agree with the actual coordinate position of the scanning aperture projected onto the object plane as measured by a "zero error" calibration pattern.

11. A system as set forth in claim 9, wherein said correction means includes means for resetting the origin of the coordinates electrically established by said scanner and said scan generator to coincide with the reference origin established by said calibration pattern.

12. A system as set forth in claim 11, further including means for establishing known distances from said origin in the object plane and for displacing said scan so that it rests on the nominal position so determined as projected onto the object plane.

13. A system as set forth in claim 12, further including means for establishing the actual position of the displaced scan with reference to the reference position in the object plane, and means for correcting any difference between the position required for calibration of this displacement of the scan.

14. An electro-optical system for testing manufactured pieces by measuring coordinates of critical portions thereof to determine whether the pieces meet predetermined standards, said system comprising:
A. an electro-optical scanner having a light sensitive face;
B. optical means to project an outline of the piece to be measured onto said face to produce an image thereon;
C. a scan generator operatively coupled to the scanner to produce scan voltages creating a scan path which traverses those edges of the image on the face whose coordinates are to be determined, thereby causing the scanner to yield a video signal from which said coordinate information can be determined; and
D. means coupled to said scanner to compare said coordinate information with stored information providing for each measured coordinate value a nominal coordinate value to produce an output signal indicative of the disparity between the two values.

* * * * *